United States Patent [19]

Barbieri et al.

[11] Patent Number: 6,005,054

[45] Date of Patent: *Dec. 21, 1999

[54] CURABLE COMPOSITION OF FLUOROELASTOMERS

[75] Inventors: Franco Barbieri, Tortona; Ezio Strepparola, Treviglio; Mauro Luca Villa; Raffaele Ferro, both of Milan, all of Italy

[73] Assignee: Austimont S.p.A., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,660

[22] Filed: Apr. 29, 1997

[30] Foreign Application Priority Data

May 2, 1996 [IT] Italy ................... MI96A0850

[51] Int. Cl.$^6$ ............................................. C08L 27/12
[52] U.S. Cl. ............................ 525/326.3; 525/326.4
[58] Field of Search ............. 428/615; 525/326.2, 525/326.3, 326.4

[56] References Cited

U.S. PATENT DOCUMENTS

| | | |
|---|---|---|
| 3,242,218 | 3/1966 | Miller et al. . |
| 3,513,203 | 5/1970 | Sianesi et al. . |
| 3,665,041 | 5/1972 | Sianesi et al. . |
| 3,810,874 | 5/1974 | Mitsch et al. . |
| 3,847,978 | 11/1974 | Sianesi et al. . |
| 3,876,654 | 4/1975 | Pattison . |
| 4,000,356 | 12/1976 | Weisgerber et al. . |
| 4,062,830 | 12/1977 | Ceccato et al. ................ 526/18 |
| 4,259,463 | 3/1981 | Moggi et al. . |
| 4,358,559 | 11/1982 | Holcomb et al. ............. 524/380 |
| 4,810,760 | 3/1989 | Strepparola et al. ......... 525/359.3 |
| 5,143,589 | 9/1992 | Marchionni et al. . |
| 5,500,042 | 3/1996 | Grootaert et al. ............. 106/287.11 |

FOREIGN PATENT DOCUMENTS

| | | |
|---|---|---|
| 0 073 087 | 3/1983 | European Pat. Off. . |
| 0 148 482 | 7/1985 | European Pat. Off. . |
| 0 151 877 | 8/1985 | European Pat. Off. . |
| 0222408 | 5/1987 | European Pat. Off. . |
| 0222409 | 5/1987 | European Pat. Off. . |
| 1356344 | 6/1974 | United Kingdom . |
| 9212199 | 7/1992 | WIPO . |

*Primary Examiner*—Jeffrey C. Mullis
*Attorney, Agent, or Firm*—Nikaido, Marmelstein Murray & Oram, LLP

[57] ABSTRACT

Use of additives of the classes of mono- and/or di-hydroxypolyfluoroethers comprising the fluoropolyoxyalkylenic repeating units chosen from the following ones: $(C_3F_6O)$; $(CFXO)$ wherein $X=F, CF_3$; $(CH_2CF_2CF_2O)$; $(CF_2(CF_2)_zCF_2O)$ wherein z is an integer equal to 1 or 2; $(C_2F_4O)$, in curable compositions of fluoroelastomers to improve the coefficient of friction without lowering the adhesion with bonding agents to metal reinforcements.

11 Claims, No Drawings

CURABLE COMPOSITION OF FLUOROELASTOMERS

The present invention relates to additives to improve the friction coefficient of curable compositions of fluoroelastomers without lowering the adhesion with bonding agents to metal reinforcements.

Vinylidene fluoride based copolymers cured elastomers, in which the vinylidene fluoride is copolymerized with one or more monomers containing an ethylene unsaturation and at least a fluorine atom, are well known and are widely utilized in a variety of application fields where an exceptional chemical resistance to solvents, lubricants, fuels, acids and similar products is required.

Cured articles obtained from these elastomeric polymers find the most suitable employment as seals (gaskets) in general, both in static and dynamic conditions, in the motor, aeronautical, missile, naval, mechanical, chemical field, in protective proofing of various supports, such as protective clothes for the contact with aggressive chemical agents.

Vinylidene fluoride based fluoroelastomers curable compositions can be cured by ionic and/or radical way.

In ionic curing the essential components are the following:
(A) a vinylidene fluoride copolymer with at least another fluoro-containing monomer having an ethylenic unsaturation;
(B) a curing accelerant selected in particular from the following: quaternary ammonium salt, quaternary phosphonium salt, phosphoranammine derivative;
(C) one or more basic acceptors, such for instance MgO and $Ca(OH)_2$;
(D) a polyhydroxylated crosslinking agent.

Examples of these compositions are described in patents GB 1,356,344, U.S. Pat. No. 3,876,654, U.S. Pat. No. 4,259,463.

Other utilizable fluoroelastomers are those crosslinked by radical curing. In this case the fluoroelastomer must contain radical curing sites deriving from the introduction in the chain of monomers subject to radical attack, for instance bromo-containing compounds such as bromoperfluoroolefins, for instance bromotrifluoroethylene, or bromoperfluoroalkylvinylethers, for instance bromoperfluoroethylvinylether. Preferably the chain end groups contain iodine atoms deriving from saturated organic compounds such as for instance RfI or $RfI_2$ wherein Rf is an hydrofluoro-carbon, chlorofluorocarbon or hydrocarbon radical having from 1 to 12 carbon atoms, preferably from 4 to 6 carbon atoms. The formulations are crosslinked with the addition of radical initiators, generally of peroxide type, such as alkylperoxides and the addition of crosslinking agents, such as for instance triallylisocyanurate (TATC), triallylcyanurate (TAC), triallylphosphate. Acceptors of acids such as for instance zinc or lead oxide are also added.

In both types of curing, inert fillers, such as silicates, sulfates and carbon black are also present; processing coadjuvants which have the purpose to improve the product processability.

The technical problem to be solved by the present invention is that to have available cured fluoroelastomeric compositions combining to the rheologic properties, processability, chemical and thermal resistance characteristics of the known fluoroelastomers also a lower friction coefficient, both static and dynamic, which is maintained during the time, also maintaining the capacity of adhering to metal surfaces pretreated with bonding agents.

In the measurement of the friction coefficient there are generally three main phases:

I starting,
II sliding,
III static.

An improved friction coefficient is desirable since long time by the utilizers since it brings for instance to a longer duration of the manufactured product and the application of less energy in the running phase.

The use of processing coadjuvants to improve the extrudability characteristics of the blends and to reduce the phenomena of adhesion to the moulds and/or of mould fouling of the same, is well known. For instance vegetable waxes, low molecular weight polyurethanes, stearates, polyesters, fluorosilicone oils, etc., can be mentioned. It is to be noticed that the number of coadjuvants employed in the fluoroelastomers in the art, is very high. However no indication or teaching in any patent or publication of the art is given to solve the problem to have available fluoroelastomers with a lower friction coefficient which maintains during the time combined to the adhesion properties specified above.

Tests carried out by the Applicant have shown that with the coadjuvants described above it is not possible to obtain a reduction of the friction coefficient lasting in the time.

It has now surprisingly found by the Applicant that by utilizing the additives of the present invention it is possible to achieve a reduction of the friction coefficient which maintains in the time in combination with an optimal balance of the other properties defined above.

An object of the present invention are therefore the use of additives of the classes of mono- and/or di-hydroxypolyfluoroethers comprising the fluoropolyoxyalkylene repeating units selected from:

$(C_3F_6O)$; (CFXO) wherein X=F, $CF_3$;
$(CH_2CF_2CF_2O)$; $(CF_2(CF_2)_zCF_2O)$ wherein z is an integer equal to 1 or 2; $(C_2F_4O)$.

The monohydroxypolyfluoroethers class preferably comprises fluoropolyethers having number average molecular weight from 500 to 5,000, preferably from 600 to 3,000, wherein the repeating units statistically distributed along the chain are selected from the following:

1) $(C_3F_6O)$, (CFXC);
2) $(C_3F_6O)$;
3) $(CH_2CF_2CF_2O)$.

Preferably the dihydroxypolyfluoroethers class comprises fluoropolyethers having number average molecular weight from 800 to 10,000, preferably from 1,000 to 5,000, more preferably from 2,000 to 4,000 wherein the repeating units statistically distributed along the chain are selected from the following:

4) $(C_2F_4O)$, $(CF_2O)$;
5) $(C_3F_6O)$, $(C_2F_4)$, (CFXO);
6) $(CH_2—CF_2—CF_2—O)$, said units being linked among each other inside the fluoropolyoxyalkylene chain as follows:
   —(O—$CF_2$—$CF_2$. $CH_2)_p$—O—$R'_f$—O—($CH_2$—$CF_2$—$CF_2$—O)$_q$—
   wherein $R'_f$ is a fluoroalkylene group having from 1 to 6 carbon atoms, p and q are integers, such to give the molecular weight as defined above.
7) $(CF(CF_3)CF_2O)$ said units being linked among each other inside the fluoropolyoxyalkylene chain as follows:
   —(O—$CF_2$—$CF(CF_3)$)$_a$—O—$R_f$—O—($CF(CF_3)$—$CF_2$—O)$_b$—
   wherein $R_f$ is a fluoroalkylene group having the meaning of $R'_f$, a and b are integers such to give the molecular weight as defined above.

The hydroxylated compounds of the above classed can be utilized also in admixture with each other.

Monohydroxypolyfluoroethers of class 1) are in particular selected from those comprised in the following general formula:

$CF_3—(C_3F_6)_{m'}(CFXO)_{n'}—CFX—ZH$ with $Z=—C(DE)—O—$ wherein D and E are equal to or different from each other and selected from H, $CH_3$ and $CF_3$, C is a carbon atom, X=F or $CF_3$; m' and n' are positive integers such that the m'/n' ratio ranges from 5 to 40 and m' and n' are such as to give the molecular weight indicated above.

These compounds are obtained by the process described in the patent U.S. Pat. No. 3,513,203, or U.S. Pat. No. 3,847,978 wherein the COF-terminal group is transformed into OH group according to the patents U.S. Pat. No. 3,810,874, U.S. Pat. No. 5,143,589.

Monohydroxypolyfluoroethers of class 2) are in particular selected from those comprised in the following general formula:

$C_3F_7O(C_3F_6O)_{r'}—CF(CF_3)—Z—H$ wherein r' is an integer and such as to give the molecular weight indicated above, Z has the indicated meaning.

These products are described in patent U.S. Pat. No. 3,242,218, wherein the COF group is transformed so as to have the terminal group OH, as described in the patents U.S. Pat. No. 3,847,978 and U.S. Pat. No. 3,810,874.

Monohydroxypo.Lyfluoroethers of class 3) are in particular selected from those comprised in the following general formula:

$F(CH_2CF_2CF_2O)_{s'}—CH_2CF_2—Z—H$ wherein s' is an integer such as to give the molecular weight indicated above, Z has the indicated meaning.

These products are described in the published European patent application No. 148,482, wherein the COF group is transformed so as to have the terminal group OH, as described in the U.S. Pat. No. 3,847,978 and U.S. Pat. No. 3,810,874.

Fluoropolyoxyalkylene diols belonging to class 4) are in particular selected from those comprised in the following general formula:

$HZ—CF_2O(C_2F_4O)_m(CF_2O)_nCF_2—ZH$ wherein Z has the meaning described above, m and n are integers such as to give the molecular weight indicated above and m/n is comprised between 0.5 and 1.5 with the oxyfluoroalkylene units statistically distributed along the chain. The preparation of these compounds can be carried out, for instance, according to the methods described in U.S. Pat. No. 3,810,874.

Fluoro-containing diols belonging to class 5) are in particular selected from the compounds representable with the following general formula:

$HZ—CF_2O—(C_3F_6O)_r(C_2F_4O)_s(CFXO)_t—CF_2—ZH$ wherein X is —F or —$CF_3$, the r, s, t indexes are integers such as to give the molecular weight indicated above and Z has the meaning previously specified.

Such compounds are obtainable by photooxidation of mixtures of $C_3F_6$ and $C_2F_4$, as described in U.S. Pat. No. 3,665,041 and subsequent transformation of terminals —COF into groups containing the —OH terminal, carried out with known methods described in the patents U.S. Pat. No. 3,847,978 and U.S. Pat. No. 3,810,874.

Fluoro-containing diols belonging to class 6) are in particular selected from the compounds having the general formula:

$HZ—CF_2CH_2(OCF_2CF_2CH_2)_p—OR'_f—O—(CH_2CF_2CF_2O)_qCH_2CF_2—ZH$ wherein Z and $R'_f$ have the indicated meaning, described in the published European patent application EP 148,482 wherein the —COF terminal groups can be transformed so as to have —OH terminal groups as described in the patents U.S. Pat. No. 3,847,978 and U.S. Pat. No. 3,810,874; p and q are integers such as to give the molecular weight indicated above.

Fluoro-containiing diols belonging to class 7) are in particular selected from the compounds having the general formula:

$A—CF(CF_3)—(OCF_2CF(CF_3))_a—OR_fO—(CF(CF_3)CF_2O)_b—CF(CF_3)—A$ wherein A is a group comprising the -OH end group, for instance $CH_2OH$, $R_f$ is a fluoroalkylene group as deffined above, a and b are integers such as to indicate the molecular weight mentioned above.

Such compounds are described in the published European patent application EP 151,877.

The fluoroelastomers utilizable according to the present invention, as already said, are copolymers of vinylidene fluoride with at least another unsaturated monomer, totally or partially fluorinated.

As comonomers we can cite hexafluoropropene, tetrafluoroethylene, chorotritluoroethylene, 1-hydropentafluoropropene, 2-hydropentafluoropropene, perfluoroalkylvinylethers wherein alkyl has a number of C atoms from 1 to 3.

In particular vinylidene fluoride copolymers with hexafluoropropene, containing or not tetrafluoroethylene, can be mentioned.

Instead of hexafluoropropene, chlorotrifluoroethylene, 1-hydropentafluoropropene, 2-hydropentafluoropropene and perfluoroalkylvinylethers can be employed.

Mixtures of the comonomers indicated above can also be employed.

The amount of perfluoroalkylvinylether and/or perfluoropropene is generally comprised between 0.5 and 30% by moles on the total of the copolymer; TFE ranges from 0 to 60% by moles, VdF generally ranges between 10–80% by moles.

Other fluoro-containing monomers can also be used as comonomers provided they contain a double bond of ethylene type and at least a fluorine atom.

Said fluoroelastomers can be prepared as described in the literature (Kirk-Othmer, Encyclopaedia of Chem. Technology vol. 8, pag. 500 and seq., 1979) preferably by operating in aqueous emulsion and optionally in the presence of chain transfer agents such as those described in the U.S. Pat. No. 4,000,356.

In particular elastomers wherein the vinylidene fluoride is comprised between 40% and 85% by moles, perfluoropropene between 15% and 306% by moles, and tetrafluoroethylene between 0 and 30% by moles, are preferred.

In ionic curing, the preferred accelerants of the classes previously mentioned, are the following:

among quaternary ammonium salts: methyl-trioctylammonium chloride, laurylpyridinium bromide, benzyltrioctyl-ammonium chloride; tetrabutylammonium chloride.

among phosphonium quaternary salts benzyltriphenylphosphonium chloride, benzyltriphenylphosphonium tetrafluoroborate, methyl-trioctylphosphonium acetate, carbetoxymethyl-triphenylphosphonium bromide; tetrabutylphosphonium chloride.

among the phosphoramine or amino phosphonium salts:
1-chloro, 1-benzyl, 1,1-diphenyl, N(diethyl)-phosphoranamine and 1-tetrafluoroborate, 1-benzyl, N,N',N" (hexamethyl)-phosphorantriamine, 1-bromo, 1-ben:zyl, 1-phenyl, N,N'(tetraethyl) phosphorandiamlne.

The basic reactants necessary to cure are inorganic compounds such as for instance ZnO, MgO, PbO, CaO or an oxide and hydroxide mixture of these metals or salts of weak acids as described in patent U.S. Pat. No. 3,876,654.

In radical curing, according to the present invention, also small amounts of the accelerants and of the basic rectants indicated above for the ionic curing, are used.

The curing agent in ionic curing is a known polyhydroxylated compound as curing agent for fluoroelastomers. We can mention: hydroquinone, resorcin, 2,2'-bis (p.hydroxyrhenyl)-hexafluoropropane or bisphenol AF, 2,2'-bis(p.hydroxyphenyl)-propane or bisphenol A.

Examples of these compounds are reported in the patent U.S. Pat. No. 3,876,654.

In general for 100 parts by weight of an elastomeric copolymer of the vinylidene fluoride (A) with one or more fluoro-containing monomers as indicated above, are employed:

from 1 to 40 parts by weight of the acceptor of inorganic acids, consisting of one or more basic oxides of bivalent metals, as indicated above, optionally in the form of complexes or cationic chelates, optionally in the presence of 0–10 parts by weight of one or more basic compounds, selected from the group comprising the calcium, strontium and barium hydrates, the metal salts of weak acids such as carbonates, benzoates and calcium, strontium, barium, sodium and potassium phosphates, optionally in the form of complexes with the normal chelants or cationic complexants of a type well known to the skilled in the art;

from 0.5 to 4 parts by weight, preferably from 1 and 2, of mono- and/or dihydroxypolyf luoroether additives of the invention;

from 0.2 to 4 parts of a curing accelerant selected from those of the classes described above;

from 0.3 to 6 parts of curing agent both in ionic and peroxidic curing. Said crosslinking agents are indicatd above;

for the curing of radical type from 0.5 to 10 parts of radical initiator.

The curable compositions of the type indicated above are cured by a process consisting in heating at first said compositions under pressure, at temperatures from 130° C. to 230° C., preferably from 160° C. to 200° C., for a time from 0.5 to 60 minutes and preferably from 1 to 20 minutes; successively the manufactured articles so obtained are post-cured in oven, at atmospheric pressure, at temperatures from 130° C. to 315° C., preferably from 200° C. to 275° C., for a time comprised between 5 and 48 and preferably between 10 and 24 hours.

The Applicant has unexpectedly found that the additives of the invention during the curing process, although they give a chemical reaction with the elastomeric chain (see the extraction tests with appropriate solvent of the examples) result unexpectedly present in a sufficient amount to modify the surface properties of the cured rubber and such as to bring to a lowering of the static and dynamic friction coefficient.

As already said, this reduced friction coefficient, besides being combined to the good rubber processability properties, is also combined to the surprising fact that the adhesion to the metal reinforcements treated with bonding agents does not: suffer any reduction. This further result is quite surprising since the conventional processing coadjuvants utilized to improve the processability of fluoroelastomers must be used in very low amounts, generally only up to 1 phr at most, in order to avoid undesired effects on the adhesion.

The curable compositions according to the present invention contain moreover in addition to the substances indicated before and to the additive of the invention, inert fillers such as for instance carbon black, white and colored fillers. The present invention does not consider the use of known plastifiers; and lubricants, such as stearates, arylphosphates, polyethers, polyesters, polyethylene, sulfones, sulfoxides, and other known additives, which would lead to the indicated inconveniences.

The components of the curable compositions according to the present invention are easily incorporable, both separately and premixed, in the vinylidene fluoride elastomeric copolymer.

In this way good curing rates at the normal processing temperatures can be reached without meeting any danger of scorching (precurirg) in the preliminary working phases, prior to the real curing operation.

Some examples are reported for illustrative purposes which are not limitative of the scope of the present invention.

EXAMPLES

In the examples reported in Tables 1–4 the following products were used:

Fluoroelastomer 1°=copolymer $CH_2=CF_2/C_3F_6$ in molar ratio 4/1 having specific weight 1.8 at 25° C., known as TECNOFLON® FOR 420 by AUSIMONT; Mooney (1+10) at 121° C. equal to 22 (ASTM D 1646).

Composition of the formulation:
Polymer: 100 parts
Bisphenol AF: 2.1 phr
Accelerant: 1 chloro-1,1 diphenyl-1 benzyl-N,N diethyl-phosphoranamine: 0.4 phr Fluoroelastomer 2°=copolymer $CH_2=CF_2/C_3F6$ in molar ratio 4/1, specific weight 1.8 at 25° C.; Mooney (1+10) at 121° C. equal to 34 (ASTM D 1646).

Composition of the formulation:
Polymer: 100 parts
Bisphenolo AF: 2.1 phr
Accelerant: 1 chloro-1,1 diphenyl-1 benzyl-N,N diethyl-phosphoranamine: 0.42 phr Fluoropolyether 1 of formula:
$CF_3O(C_3F_6O)_m(CF_2O)_{n'}CF_2CH_2OH$
with average molecular weight (from hydroxyl titre) of 700.

Fluoropolyether 2 of general formula:
$HO-CH_2CF_2O(CF_2CF_2O)_m(CF_2O)_{n}CF_2CH_2OH$
with m/n=1 and molecular weight 2,000

Fluoropolyether 3 cf general formula as fluoropolyether 2 and molecular weight 4,000.

Black MT: Medium Thermal Carbonblack

Tremin 283 600 EST: Wollastonite treated with epoxysilanes.

STRUKTOL WS 280: silicone oil supported on inorganic carrier (25%).

The results of the tests are reported in Tables 1, 2, 4.

Characterization of the cured fluoroelastomers

Determination of the friction coefficient.

The adopted procedure is the following:

The rubber sheets after moulding and after post curing were kept hung in a container to avoid any surface pollution.

The sheets were conditioned at 23° C. and 50% HR (relative humidity) for at least 48 hours.

The sheets were placed on an horizontal rigid plane of the dynamometer and let adhere by adhesive double tape.

The device containing the two steel spheres having a diameter of 12.7 mm was put on the test plate after having carefully cleaned the two spheres with acetone and having perfectly dried them.

The test was carried out at the sliding rate of 100 mm/min by applying on the spheres three different levels of load (2.11 N, 4.07 N and 7.01 N) each time considering different zones of the sheet. For each sample two sheets were examined.

The test cycle consisted in sliding the spheres for a stretch of about 60 mm and then stopping the machine by continuing to register the friction force. In this way curves of friction force vs. time were obtained, from which the friction force values were taken:

I starting
II sliding
III static.

The friction coefficient (f.c.) for each phase is determined by the well known equation:

$$f.c = F/W$$

wherein F=friction force

W=weight applied on the spheres.

The variation of the friction coefficient depending on the ageing time at 200° C. for instance 1, 11 and 2, 12 is reported in Table 4.

The extraction tests of the fluoroethers 1,2,3 of the examples 5, 9, 11, 12 from the cured rubber with 1,1,2 trichloro-1,2,2 trifluoroethane in azeotropic mixture with acetone carried out in SOXTEC SYSTEM HT2 1045 Extraction Unit are shown in Table 3.

The $^{19}F$ NMR analysis of the extracts showed the presence of polymers having Low molecular weight attributable to the starting elastomer and only 2–3% of the extract resulted to be fluoroether.

TABLE 1

| | | EXAMPLE | | | | | | |
|---|---|---|---|---|---|---|---|---|
| | | 1 | 2 | 3 | 4 | 5 | 6 | 7 |
| Elastomeric compositions: CURING: in press aT 170° C. FOR 10', post cure in oven at 250° C. for 24 hours | | | | | | | | |
| Elastomer 1 | parts | 50 | 50 | 50 | 50 | 50 | 50 | 50 |
| Elastomer 2 | parts | 50 | 50 | 50 | 50 | 50 | 50 | 50 |
| MgO | phr | 3 | 3 | 3 | 3 | 3 | 3 | 3 |
| Ca(OH)$_2$ | " | 6 | 6 | 6 | 6 | 6 | 6 | 6 |
| Fluoropolyether 1 | " | | | | | | | |
| Fluoropolyether 2 | " | | | | | | | 2.5 |
| Fluoropolyether 3 | " | | | | | | 2.5 | |
| BLACK MT | " | | | | 1 | 2 | | |
| TREMIN 283 | " | 30 | | 30 | 30 | 30 | 30 | 30 |
| CARNAUBA WAX | " | | 35 | | | | | |
| STRUKTOL W S280 | " | | | | 0.7 0.5 | | | |
| CHARACTERISTICS OF THE CURED PRODUCT | | | | | | | | |
| Tensile properties: (1) | | | | | | | | |
| Stress at break MPa | | 17.2 | 16.9 | 17.8 | 15.7 | 16 | 15.5 | 16.5 |
| Modulus 20 MPa | | 2.0 | 1.6 | 2.17 | 2.0 | 2.0 | 1.8 | 2.0 |
| Modulus 100 MPa | | 8.4 | 10.2 | 9.2 | 8.3 | 8.1 | 8.3 | 8.5 |
| Elongation at break % | | 184 | 163 | 178 | 172 | 184 | 162 | 186 |
| Shore hardness A (2) points | | 76 | 71 | 78 | 76 | 76 | 77 | 76 |
| Compression set | | | | | | | | |
| O Ring 214 (3) % | | 15.8 | 13.6 | | 16 | 15.5 | | |
| Disc (4) " | | 11.5 | 9.71 | | 11.2 | | | |

| | | EXAMPLE | | | | |
|---|---|---|---|---|---|---|
| | | 8 | 9 | 10 | 11 | 12 |
| Elastomeric compositions: CURING: in press at 170° C. FOR 10', post cure in oven at 250° C. for 24 hours | | | | | | |
| Elastomer 1 | parts | 50 | 50 | 50 | 50 | 50 |
| Elastomer 2 | parts | 50 | 50 | 50 | 50 | 50 |
| MgO | phr | 3 | 3 | 3 | 3 | 3 |
| Ca(OH)$_2$ | " | 6 | 6 | 6 | 6 | 6 |
| Fluoropolyether 1 | " | | | | 0.5 | 0.5 |
| Fluoropolyether 2 | " | | | 2.5 | | |
| Fluoropolyether 3 | " | 1 | 2 | | 1 | 1 |
| BLACK MT | " | | | | | 30 |

TABLE 1-continued

| | | | | | | |
|---|---|---|---|---|---|---|
| TREMIN 283 | " | 35 | 35 | 35 | | 35 |
| CARNAUBA WAX | " | | | | | |
| STRUKTOL W S280 | " | | | | | |
| CHARACTERISTICS OF THE CURED PRODUCT | | | | | | |
| Tensile properties: (1) | | | | | | |
| Stress at break | MPa | 16.7 | 16.6 | 16.5 | 17.1 | 15.7 |
| Modulus 20 | MPa | 1.6 | 1.9 | 2.4 | 2.0 | 1.8 |
| Modulus 100 | MPa | 10.1 | 10.6 | 14.3 | 8.4 | 11.3 |
| Elongation at break | % | 163 | 155 | 123 | 188 | 140 |
| Shore hardness A (2) | points | 71 | 71 | 70 | 76 | 71 |
| Compression set | | | | | | |
| O Ring 214 (3) | % | 13.9 | 13.5 | | | |
| Disc (4) | % | 10 | | | | |

(1) ASTM D 412
(2) ASTM D 2240
(3) ASTM D 1414
(4) ASTM D 395

TABLE 2

FRICTION COEFFICIENT OF STEEL SPHERES ON RUBBER
T = 23° C. V = 100 mm/min.

| EXAM- | STARTING *N | | | SLIDING | | | STATIC | | |
|---|---|---|---|---|---|---|---|---|---|
| PLES | 2.11 | 4.07 | 7.01 | 2.11 | 4.07 | 7.01 | 2.11 | 4.07 | 7.01 |
| 1 | 2.37 | 2.41 | 2.00 | 1.90 | 1.84 | 1.74 | 1.37 | 1.18 | 1.14 |
| 2 | 1.94 | 1.82 | 1.68 | 1.84 | 1.80 | 1.65 | 0.85 | 1.10 | 0.94 |
| 3 | 1.90 | 1.84 | 1.83 | 1.90 | 1.72 | 1.71 | 1.04 | 1.03 | 1.00 |
| 4 | 1.23 | 1.60 | 1.42 | 1.02 | 0.93 | 0.89 | 0.50 | 0.52 | 0.44 |
| 5 | 1.52 | 1.59 | 1.45 | 1.00 | 0.83 | 0.78 | 0.52 | 0.46 | 0.38 |
| 6 | 1.13 | 1.06 | 0.96 | 0.82 | 0.75 | 0.65 | 0.38 | 0.38 | 0.34 |
| 7 | 1.27 | 1.15 | 1.00 | 1.09 | 0.98 | 0.88 | 0.34 | 0.29 | 0.21 |
| 8 | 1.66 | 1.36 | 1.30 | 1.05 | 0.88 | 0.79 | 0.55 | 0.49 | 0.43 |
| 9 | 1.56 | 1.28 | 1.08 | 1.00 | 0.85 | 0.78 | 0.50 | 0.43 | 0.43 |
| 10 | 1.52 | 1.20 | 1.17 | 1.18 | 1.13 | 1.02 | 0.55 | 0.47 | 0.45 |
| 11 | 1.21 | 1.16 | 1.18 | 0.81 | 0.74 | 0.65 | 0.40 | 0.32 | 0.27 |
| 12 | 1.56 | 1.04 | 1.13 | 1.00 | 0.87 | 0.77 | 0.40 | 0.32 | 0.34 |

*N = load applied in Newton

TABLE 3

| Examples | Extract |
|---|---|
| 5 | 0.10% |
| 9 | 0.0045% |
| 11 | 0.060% |
| 12 | 0.0055% |

TABLE 4

VARIATION OF THE FRICTION COEFFICIENT IN THE TIME AT 200° C.

| EXAMPLES | STARTING *N | | | SLIDING | | | STATIC | | |
|---|---|---|---|---|---|---|---|---|---|
| | 2.11 | 4.07 | 7.01 | 2.11 | 4.07 | 7.01 | 2.11 | 4.07 | 7.01 |
| 1 initial | 2.37 | 2.41 | 2.00 | 1.90 | 1.84 | 1.37 | 1.37 | 1.18 | 1.14 |
| x 2 days | 2.18 | 2.36 | 2.07 | 2.09 | 1.94 | 1.56 | 1.56 | 1.33 | 1.31 |
| x 7 days | 2.44 | 2.40 | 1.43 | 2.09 | 2.02 | 1.94 | 1.42 | 1.30 | 1.38 |
| x 30 days | 2.15 | 1.94 | 1.84 | 1.73 | 1.69 | 1.67 | 1.21 | 1.38 | 1.13 |
| 2 initial | 1.94 | 1.82 | 1.68 | 1.84 | 1.80 | 1.65 | 0.85 | 1.10 | 0.94 |
| x 2 days | 2.09 | 1.67 | 1.46 | 1.85 | 1.77 | 1.65 | 1.23 | 1.40 | 1.23 |
| x 7 days | 1.94 | 1.77 | 1.40 | 1.80 | 1.74 | 1.61 | 1.42 | 1.35 | 1.06 |
| x 30 days | 1.95 | 1.86 | 1.57 | 1.75 | 1.62 | 1.52 | 1.23 | 1.25 | 1.11 |
| 11 initial | 1.21 | 1.16 | 1.18 | 0.81 | 0.74 | 0.65 | 0.40 | 0.32 | 0.27 |
| x 2 days | 1.56 | 1.43 | 1.03 | 0.85 | 0.71 | 0.66 | 0.43 | 0.37 | 0.29 |
| x 7 days | 0.83 | 1.04 | 0.69 | 0.77 | 0.73 | 0.64 | 0.38 | 0.56 | 0.25 |
| x 30 days | 1.28 | 1.09 | 1.20 | 0.64 | 0.65 | 0.66 | 0.52 | 0.48 | 0.48 |
| 12 initial | 1.56 | 1.04 | 1.13 | 1.00 | 0.87 | 0.77 | 0.40 | 0.32 | 0.34 |
| x 2 days | 1.20 | 1.02 | 0.81 | 0.98 | 0.86 | 0.74 | 0.50 | 0.40 | 0.33 |
| x 7 days | 1.75 | 1.23 | 0.97 | 1.18 | 1.03 | 0.93 | 0.66 | 0.61 | 0.51 |
| x 30 days | 1.58 | 1.39 | 1.24 | 1.34 | 1.15 | 1.15 | 0.85 | 1.02 | 1.00 |

*N = load applied in Newton

We claim:

1. A method of improving the friction coefficient of fluoroelastomer compositions consisting of incorporating as additives mono- and/or di-hydroxypolyfluoroethers containing in the chain the fluoropolyoxy-alkylene repeating units selected from the following: ($C_3F_6O$); (CFXO) wherein X=F, $CF_3$; ($CH_2CF_2CF_2O$); ($C_2F_4O$) in ionic curing compositions of fluoroelastomers wherein the crosslinking agent is 2,2'-bis(p-hydroxyphenyl)-hexafluoropropane or radical curing compositions of fluoroelastomers without lowering the adhesion of bonding agents to metal reinforcements, wherein said mono-hydroxypolyfluoroethers additives have number average molecular weights from 500 to 5,000, and are selected from the group consisting of 1) $CF_3O$—$(C_3F_6O)_{m'}(CFXO)_{n'}$—CFX—ZH
   with Z=—C(DE)—O—
   wherein D and E are equal to or different from each other and are selected from H, $CH_3$ and $CF_3$, C is a carbon atom, X=F or $CF_3$; m' and n' are positive integers such that the m'/n' ratio ranges from 5 to 40 and m' and n' are such as to give the number average molecular weight indicated as above indicated;

2) $C_3F_7O(C_3F_6O)_{r'}$—$CF(CF_3)$—Z—H
   wherein r' is an integer satisfying the number average molecular weight as above indicated, and Z has the indicated meaning;

3) F $(CH_2CF_2CF_2O)_{s'}$—$CH_2CF_2$—Z—H
   wherein s' is an integer to satisfy the molecular weight above indicated, and Z has the above indicated meaning; and
   wherein said di-hydroxypolyfluoroethers additives have number average molecular weights of from 800 to 10,000, and are selected from the group consisting of 4) HZ—$CF_2O(C_2F_4O)_m(CF_2O)_nCF_2$—ZH
   wherein Z has the meaning described above, m and n are integers to satisfy the molecular weight above indicated and m/n ranges between 0.5 and 1.5 with the oxyfluoroalkylene units statistically distributed along the chain;

5) HZ—$CF_2O$—$(C_3F_6O)_r(C_2F_4O)_s(CFXO)_t$—$CF_2$—ZH
   wherein X is —F or —$CF_3$, the r, s, t indexes are integers such as to give the number average molecular weight above indicated and X has the meaning previously specified;

6) HZ—$CF_2CH_2(OCF_2CF_2CH_2)_P$—$OR_f$—O—$(CH_2CF_2CF_2O)_qCH_2CF_2Z$—H; and

7) A—$CF(CF_3)$—$(OCF_2CF(CF_3))_a$—$OR_fO$—$(CF(CF_3)CF_2O)_b$—$CF(CF_3)$—A
   wherein A is a group containing the —OH end group, $R_f$ is a fluoroalkylene group, a and b are integers satisfying the number average molecular weight above indicated, the resulting additive-containing fluoroelastomer composition consisting of said friction improving coefficient additives, said fluoroelastomers, said crosslinking agent, curing accelerants and optional inert fillers.

2. The method of claim 1 wherein the monohydroxyaolyfluoroether comprises fluoropolyethers having number average molecular weights from 500 to 5,000, and wherein the repeating units statistically distributed along the chain are selected from the following:

1) ($C_3F_6O$) (CFXO);
2) ($C_3F_6O$);
3) ($CH_2(CF_2CF_2O$)

the dihydroxypolyfluoroethers comprises fluoropolyethers having number average molecular weights from 800 to 10,000, wherein the repeating units are statistically distributed along the chain and are selected from the following:

4) ($C_2F_4O$), ($CF_2O$)
5) ($C_3F_6O$), ($C_2F_4O$), (CFXO);
6) ($CH_2$—$CF_2$—$CF_2$—O) said units being linked among each other inside the fluoropolyoxyalkylene chain as follows:
   —(O—$CF_2$—$CF_2$—$CH_2$)$_P$O—$R'_f$—O—($CH_2$—$CF_2$—$CF_2$—O)$_q$—
   wherein $R'_f$ is a fluoroalkylene group, p and q are integers, and 7) ($CF(CF_3)$) $CF_2O$)
   said units being linked among each other inside the fluoropolyoxyalkylene chain as follows:
   (O—$CF_2$—$CF(CF_3)$)$_a$—O—$R_f$—O—$(CF(CF_3)$—$CF_2$—O)$_b$—
   wherein $R_f$ is a fluoroalkylene group, and a and b are integers.

3. The method of claim 2 wherein the mono- and/or di-hydroxypolyfluoroethers have number average molecular weights ranging from 600 to 3,000; the di-hydroxypolyfluoroethers have number average molecular weights from 2,000 to 4,000.

4. The method according to claim 1, wherein the amount of mono- and/or dihydroxypolyfluoroether ranges from 0.5 to 4 parts by weight per 100 parts by weight of fluoroelastomer.

5. The method according to claim 4, wherein the amount of mono- and/or dihydroxypolyfluoroether ranges between 1 and 2.

6. The method of claim 2 wherein the fluoroelastomers are based on vinylidene fluoride copolymers.

7. The method of claim 6 wherein the fluoroelastomers are copolymers of vinylidene fluoride with at least another monomer, totally or partially fluorinated, comprising an ethylene unsaturation.

8. The method of claim 7, wherein the comonomers are hexafluoropropene, tetrafluoroethylene, chlorotrifluoroethylene, 1-hydropentafluoropropene, 2-hydropentafluoropropene, perfluoroalkylvinylethers and wherein the alkyl has from 1 to 3 carbon atoms.

9. The method of claim 8, wherein the fluoroelastomers are copolymers of vinylidene fluoride with hexafluoropropene, and optionally tetrafluoroethylene.

10. The method according to claim 8, wherein the amount of perfluoroalkylvinylether and/or perfluoropropene ranges from 0.5 to 30% by moles on the total of copolymer, TFE ranges from 0 to 60% by moles, VdF generally ranges from 10–80% by moles.

11. The method according to claim 10, wherein the vinylidene fluoride ranges from 40% to 85% by moles, perfluoropropene from 15% to 30% by moles, and the tetrafluoroethylene from 0 to 30% by moles.

* * * * *